US008892597B1

(12) United States Patent
Strohman

(10) Patent No.: US 8,892,597 B1
(45) Date of Patent: Nov. 18, 2014

(54) SELECTING DATA COLLECTIONS TO SEARCH BASED ON THE QUERY

(71) Applicant: Trevor Strohman, Sunnyvale, CA (US)

(72) Inventor: Trevor Strohman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/725,341

(22) Filed: Dec. 21, 2012

Related U.S. Application Data

(60) Provisional application No. 61/735,886, filed on Dec. 11, 2012.

(51) Int. Cl.
*G06F 17/30* (2006.01)

(52) U.S. Cl.
CPC .................. *G06F 17/30864* (2013.01)
USPC ........................................ 707/769

(58) Field of Classification Search
CPC .................................. G06F 17/30132
USPC ........... 707/2, 3, 767, 738, 769; 709/204–206
See application file for complete search history.

(56) References Cited

U.S. PATENT DOCUMENTS

| 7,895,221 | B2 | 2/2011 | Colledge et al. | |
|---|---|---|---|---|
| 2005/0131872 | A1* | 6/2005 | Calbucci et al. | 707/3 |
| 2008/0077557 | A1* | 3/2008 | Schneider et al. | 707/2 |
| 2010/0185619 | A1* | 7/2010 | Zhang et al. | 707/738 |
| 2010/0318538 | A1 | 12/2010 | Wyman et al. | |
| 2012/0096033 | A1 | 4/2012 | Shah et al. | |
| 2012/0278350 | A1* | 11/2012 | Bhatia et al. | 707/767 |
| 2012/0323839 | A1 | 12/2012 | Kiciman et al. | |

FOREIGN PATENT DOCUMENTS

WO    2010/093618    8/2010

* cited by examiner

*Primary Examiner* — Etienne Leroux
(74) *Attorney, Agent, or Firm* — Fish & Richardson P.C.

(57) ABSTRACT

Methods, systems, and apparatus, including computer programs encoded on computer storage media, for receiving a new query that is not in a query cache, the new query including one or more query terms; determining that the new query is a variant of a cached query in the query cache; in response to determining that the new query is a variant of the cached query, obtaining a first probability, the first probability indicating a likelihood that a collection of resources includes resources that satisfy the cached query; calculating a second probability, the second probability being a probability that the one or more query terms in the new query name an entity or are a phrase; calculating a third probability, the third probability being a probability that the cached query is a specific query; and determining, based on the first, second, and third probabilities, whether to search the collection of resources.

18 Claims, 2 Drawing Sheets

SELECTING DATA COLLECTIONS TO SEARCH BASED ON THE QUERY

CROSS-REFERENCE TO RELATED APPLICATIONS

This application claims the benefit under 35 U.S.C. §119(e) of U.S. Provisional Application Ser. No. 61/735,886, filed on Dec. 11, 2012 entitled "SELECTING DATA COLLECTIONS TO SEARCH BASED ON THE QUERY," the entirety of which is hereby incorporated by reference.

BACKGROUND

This specification relates to information retrieval.

Internet search engines aim to identify resources (e.g., web pages, images, text documents, multimedia context) that are relevant to a user's needs and to present information about the resources in a manner that is most useful to the user. Internet search engines return search results in response to a user submitted query.

SUMMARY

This specification describes techniques that interoperate with a filter engine that stores a query cache, e.g., data describing a collection of queries. The filter engine stores, for each query in the query cache, respective probabilities that the query is associated with a particular collection of resources, e.g., a news, images, video, or maps. Each collection of resources can include a particular category of resources, e.g., resources categorized as news, images, video, or maps. A probability that a particular query in the query cache is associated with a particular collection of resources indicates a likelihood that the particular collection of resources includes resources that satisfy the cached query. Based on a query's respective probabilities, a search engine can identify a particular collection of resources that should be searched to identify resources that satisfy the query.

The system can use data stored in the query cache to predict whether one or more collections of resources should be searched to identify resources that satisfy a new query that is not in the query cache. For example, the system determines a similarity between the new query and a cached query in the query cache. The system obtains a probability that the cached query is associated with a particular collection of resources, e.g., a maps collection. The obtained probability indicates a likelihood that the particular collection of resources includes resources that satisfy the cached query. The system then calculates a probability that the new query names an entity or is a phrase. The system can also calculate a probability that the cached query is a specific query, e.g., a query that references a particular concept or entity. Based on one or more of these calculated probabilities, the system can determine whether a particular collection of resources should be searched to identify resources that satisfy the new query.

In general, one innovative aspect of the subject matter described in this specification can be embodied in methods that include the actions of receiving a new query that is not in a query cache, the new query including one or more query terms; determining that the new query is a variant of a cached query in the query cache; in response to determining that the new query is a variant of the cached query, obtaining a first probability, the first probability indicating a likelihood that a particular collection of resources includes resources that satisfy the cached query; calculating a second probability, the second probability being a probability that the one or more query terms in the new query name an entity or are a phrase; calculating a third probability, the third probability being a probability that the cached query is a specific query; and determining, based on the first, second, and third probabilities, whether to search the particular collection of resources to identify resources that satisfy the new query.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The second probability indicates a likelihood that resources in the particular collection of resources include the one or more query terms, the one or more query terms being mutually dependent. Calculating a third probability, the third probability being a probability that the cached query is a specific query includes determining a count of resources that include the one or more query terms from the cached query; determining a total count of resources in the particular collection of resources; and calculating a fraction equal to the count of resources that include the one or more query terms from the cached query divided by the total count of resources in the particular collection of resources.

Calculating a third probability, the third probability being a probability that the cached query is a specific query includes generating, based on a text clustering, a plurality of clusters, the clusters including resources from the particular collection of resources, wherein the resources have been identified as satisfying the cached query; determining a count of resources in a largest cluster in the plurality of clusters, the largest cluster including more resources than other clusters in the plurality of clusters; determining a total count of resources in the particular collection of resources; and calculating a fraction equal to the count of resources in a largest cluster in the plurality of clusters divided by the total count of resources in the particular collection of resources.

Determining, based on the first, second, and third probabilities, whether to search the particular collection of resources to identify resources that satisfy the new query includes determining a trigger value based on the first, second, and third probabilities; determining whether the trigger value satisfies a threshold value for the particular collection of resources; and in response to determining that the trigger value satisfies the threshold value for the particular collection of resources, searching the particular collection of resources to identify resources that satisfy the new query. The specific query references a specific concept or an entity.

The subject matter described in this specification can be implemented in particular embodiments so as to realize one or more of the following advantages. A system can use data describing queries stored in a query cache to predict whether or not particular collections of resources should be searched to identify resources that satisfy a new query that is not stored in the query cache. System resources can be conserved by processing the new query using collections of resources that have a higher likelihood of including resources that satisfy the new query. Latency, or response time, for processing the new query can be reduced by not processing the new query using particular collections of resources that do not have a threshold likelihood of including resources that satisfy the new query.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
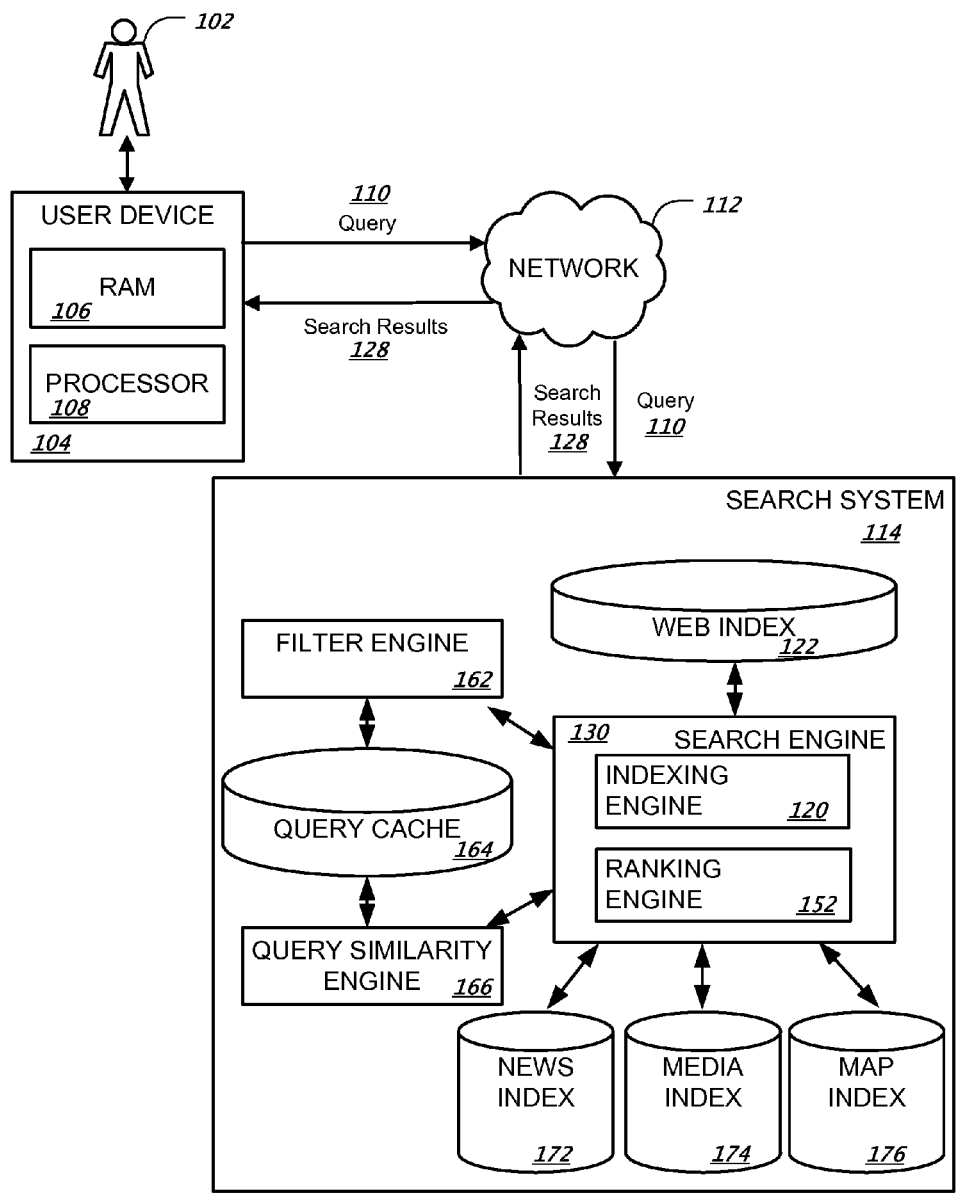
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. For example, the user device 104 can be a computer coupled to the search system 114 through a data communication network 112, e.g., a local area network (LAN) or wide area network (WAN), e.g., the Internet, or a combination of networks. In some cases, the search system 114 can be implemented on the user device 104, for example, if a user installs an application that performs searches on the user device 104. The user device 104 will generally include a memory, e.g., a random access memory (RAM) 106, for storing instructions and data and a processor 108 for executing stored instructions. The memory can include both read only and writable memory. For example, the user device 104 can be a personal computer of some kind, a cloud client device, a smartphone, a tablet, or a personal digital assistant. The user device 104 can run an application program, e.g., a web browser, that can interact with the search system 114 to display web pages that provide a user interface to the search system 114 for the user 102 of the user device 104.

A user 102 can use the user device 104 to submit a query 110 to the search system 114. A search engine 130 within a web search system 114 performs the search to identify resources matching the query. When the user 102 submits a query 110, the query 110 may be transmitted through the network 112 to the search system 114. The search system 114 includes a web index 122 and the search engine 130. In some implementations, the search system 114 includes other collections of resources, e.g., a news index 172, a media index 174, and a map index 176. The search system 114 responds to the query 110 by generating search results 128, which are transmitted through the network to the user device 104 for presentation to the user 102, e.g., as a search results web page to be displayed by a web browser running on the user device 104.

When the query 110 is received by the search engine 130, the search engine 130 identifies resources that satisfy the query 110. The search engine 130 will generally include an indexing engine 120 that indexes resources on the Internet and uses the web index 122 to store the index information, and a ranking engine 152 or other software that generates scores for the resources that satisfy the query 110 and that ranks the resources according to their respective scores. Similarly, the indexing engine 120 can categorize the indexed resources and store the index information in corresponding indexes. For example, resources categorized as news articles can be stored in the news index 172, resources categorized as music, images, or videos can be stored in the media index 174, and resources relating to maps can be stored in the map index 176.

The search engine 130 is configured to interact with a filter engine 162. The filter engine 162 can communicate with a query cache 164. The query cache 164 includes data for each of a collection of queries. The queries in the collection of queries can be, for example, the most popular queries, as determined based on counts of the respective queries that were received by the search system 114. For each query in the query cache 164, the filter engine 162 can store, in the query cache 164, respective probabilities that the query is associated with particular collections of data, e.g., the news index 172, the media index 174, or the map index 176. Other collections of data can exist including, for example, an images index and a video index.

When the query 110 is received by the search engine 130, the search engine 130 can provide the query 110 to the filter engine 162. The filter engine 162 can determine whether the query 110 is in the query cache 164. If the query 110 is in the query cache 164, the filter engine 162 can provide respective probabilities that the query is associated with particular collections of data. Based on the respective probabilities, the search engine 130 can determine whether particular collections of data should be searched to identify resources that satisfy the query 110.

In some implementations, the search engine 130 is configured to interact with a query similarity engine 166. The query similarity engine 166 can also communicate with the query cache 164. When the query 110 is received by the search engine 130, the search engine 130 can provide the query 110 to the query similarity engine 166.

The query similarity engine 166 is configured to determine whether a query, e.g., the query 110, is a variant of a query in the query cache 164. The query similarity engine 166 can determine whether a particular query is a variant of another query based on known string similarity measures, e.g., edit distance, Jaro-Winkler distance, Jaccard index, or Levenshtein distance. The query similarity engine 166 can select, for the query 110, the best variant in the query cache 164. For example, the query similarity engine 166 can determine that a query "cascal mountain view" in the query cache 164 is the best variant for the query "cascal mountain view happy hour."

The query similarity engine 166 is also configured to determine a probability indicating whether the query names an entity or is a phrase. An entity can be, for example, a person, place, thing, or concept. A phrase is one or more words that form an expression. Entities and phrases can be determined based on an evaluation of resources, as described below. For example, the query similarity engine 166 can determine a probability indicating whether the query terms "san francisco giants" names an entity or is a phrase. In some implementations, the query similarity engine 166 determines whether a query names an entity or is a phrase based on evaluating the number of times that mutually dependent query terms appear in resources, e.g., resources in the web index 122. In some implementations, a first term and a second term are determined to be mutually dependent when the first and second terms appear together in a threshold number of resources. In some other implementations, the first term and the second term are determined to be mutually dependent when the first and second terms appear together in a particular order in a threshold number of resources. For example, the query similarity engine 166 can determine the number of times the query terms "san francisco" appear in resources with the term "san"

appearing in front of the term "francisco." A probability indicating whether the query terms name an entity or are a phrase can be determined based on a fraction of the number of times that mutually dependent query terms appear in resources that were indexed by the indexing engine 120 divided by the total number of resources that were indexed by the indexing engine 120.

In some implementations, the query similarity engine 166 determines a probability indicating whether the query terms name an entity or are a phrase based on a statistical data model. The statistical data model can be, for example, a hidden Markov model (HMM) or a conditional random field (CRF). The statistical data model can be trained using a seed group of sentences that name entities or are phrases that have been identified, for example, based on human input. Upon training using a conventional machine learning technique, the statistical data model can recognize sentence structures that name entities or are phrases. For example, for a sentence "Bohd Hughmason is the president of Fregmul, Inc.," the statistical data model can determine a probability that "Bohd Hugmason" is the name of an individual, that "Bohd Hugmason" is a president of "Fregmul, Inc.", that "Fregmul, Inc." refers to a company, and that the sentence "Bohd Hughmason is the president of Fregmul, Inc." names an entity or is a phrase.

In some implementations, the query similarity engine 166 is configured to determine a probability indicating whether a query is a specific query. A specific query is a query that references a specific concept or entity. In some implementations, the query similarity engine 166 determines a probability indicating whether a query is a specific query based on the number of times that mutually dependent query terms appear in resources, e.g., resources in the web index 122, that satisfy the query. A first term and a second term are determined to be mutually dependent when the first and second terms appear together in a threshold number of resources. In some other implementations, the first term and the second term are determined to be mutually dependent when the first and second terms appear together in a particular order in a threshold number of resources. A probability indicating whether the query is a specific query can be determined based on a fraction of the number of times that mutually dependent query terms appear in resources that satisfy the query divided by the total number of resources that satisfy the query. In some implementations, a mutual information of query terms can be calculated. For example, for a first term and a second term, the mutual information can be calculated to measure the degree of mutual dependence between the first term and the second term. In particular, the mutual information can provide information on the likelihood that the second term will occur in a document when the first term occurs in the document.

In some implementations, the query similarity engine 166 determines a probability indicating whether a query is a specific query based on evaluating clusters of resources that were identified as satisfying the query. The query similarity engine 166 can generate clusters of resources using various text clustering techniques, e.g., k-means clustering based on a term frequency-inverse document frequency (TF-IDF). In some implementations, the clusters of resources are obtained from the filter engine 162. As a result of the clustering, resources that are similar to one another, e.g., resources that include the query terms, are included in the same cluster. For example, there may be many different types of resources that include the term "car," e.g., product brochures, novels, and car dealership websites. Text clustering of such resources may indicate that resources that contain the term "car" are generally unrelated. In contrast, text clustering of resources that include the terms "india house northampton" may indicate that such resources are generally more related to one another because they relate to restaurants.

The query similarity engine 166 can calculate a probability indicating whether a query is a specific query by dividing the number of resources that are in the largest cluster of resources, e.g., the cluster that includes the most number of resources, by the total number of resources that are in the clusters of resources.

For example, for a query "india house northampton," the query similarity engine 166 can identify 45,000 resources that contain the terms "india house northampton." The query similarity engine 166 can then cluster the identified resources into a first, second, and third cluster. The first cluster may include 2,000 resources, the second cluster may include 1,000 resources, and the third cluster may include 42,000 resources. The query similarity engine 166 can calculate a probability indicating whether the query "india house northampton" is a specific query by dividing the number of resources that are in the largest cluster of resources, e.g., the cluster containing 42,000 resources, by the total number of resources that are in the clusters of resources, e.g., 45,000 resources. In this example, the query similarity engine 166 calculates a probability of 0.93 that the query "india house northampton" is a specific query.

The indexes described above, e.g., the web index 122, the news index 172, the media index 174, and the map index 176, and the query cache 164 can be implemented as a database, e.g., a collection of data. The data does not need to be structured in any particular way, or structured at all, and it can be stored on storage devices in one or more locations. Thus, for example, the web index 122 can include multiple collections of data, each of which may be organized and accessed differently. Additionally, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Figure 2:
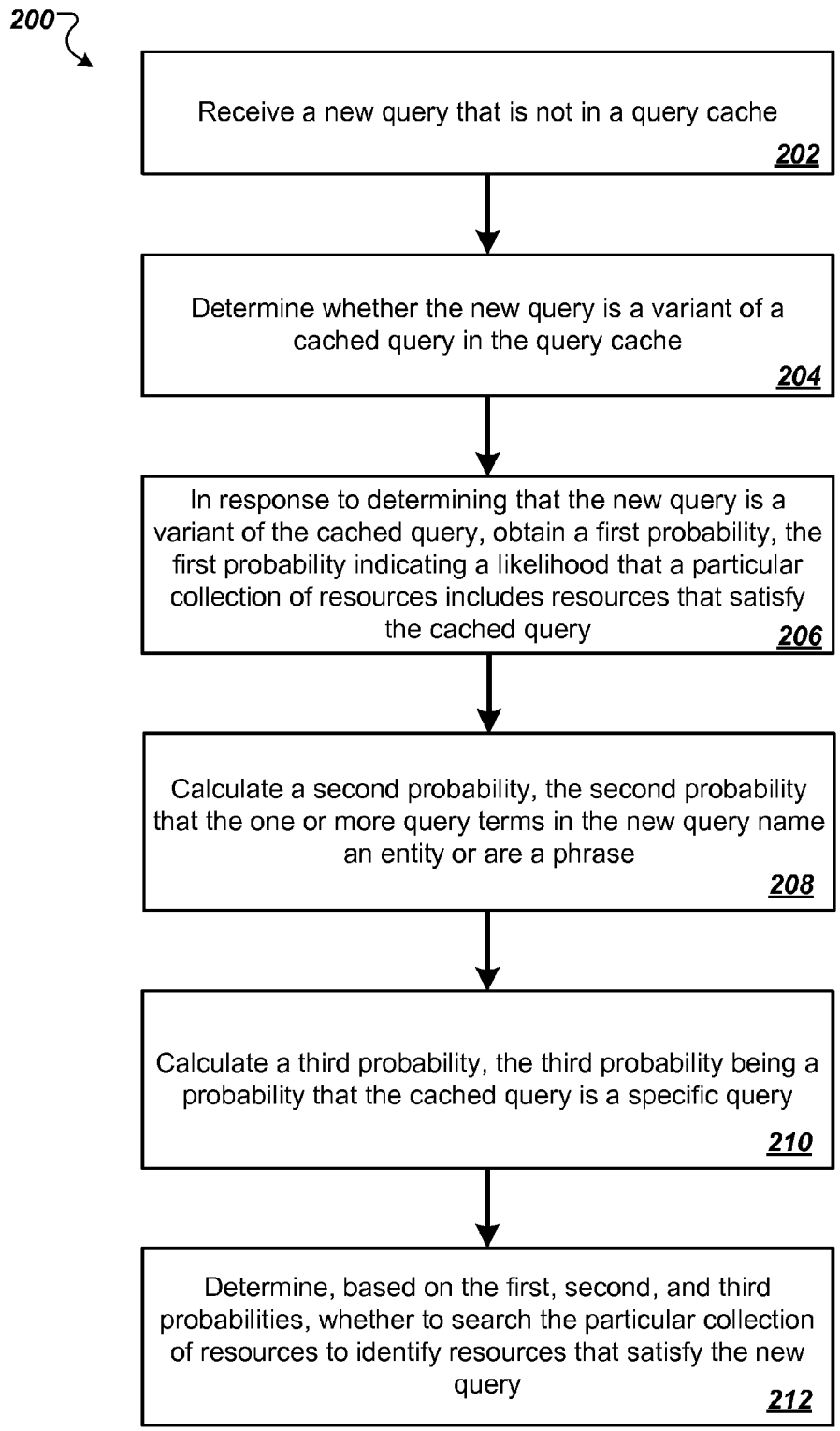
FIG. 2 is a flow diagram of an example process for selecting a collection of resources to search in response to a received query.

FIG. 2 is a flow diagram of an example process for selecting a collection of resources to search in response to a received query. For convenience, the process 200 will be described as performed by a system including one or more computing devices. For example, a search system 114, as described in reference to FIG. 1, can be used to perform the process 200.

The system receives a new query (202). For example, the system can receive a new query "cascal mountain view happy hour" from a user interacting with a search system through a user device, for example, a user 102 interacting with search system 114 through user device 104 as described in reference to FIG. 1.

The system determines whether the new query is a variant of a query in a query cache (204). The system can determine whether the new query is a variant of a query in a query cache, as described in reference to FIG. 1. For example, the system can compare the new query "cascal mountain view happy hour" to each query in the query cache, and can determine that the new query is the best variant of a cached query "cascal mountain view."

The system obtains, in response to a determination that the new query is a variant of the cached query, a first probability that the cached query is associated with a particular collection of resources (206). The system can obtain the first probability for the cached query as described in reference to FIG. 1. For example, the system can obtain a probability that the cached query "cascal mountain view" is associated with a news collection of resources, e.g., the news index 172. This probability indicates a likelihood that the news collection of resources includes resources that satisfy the cached query "cascal mountain view." Similarly, the system can obtain a probability that the query "cascal mountain view" is associated with a maps collection of resources, e.g., the map index 176, which indicates a likelihood that the maps collection of resources includes resources that match the cached query "cascal mountain view."

The system calculates a second probability that the new query names an entity or is a phrase (208). The system can calculate a second probability that the new query names an entity or is a phrase based on the techniques described in reference to FIG. 1. For example, the system can calculate a probability that the new query "cascal mountain view happy hour" name an entity or is a phrase.

The system calculates a third probability that the cached query is a specific query (210). The system can calculate the third probability that the cached query is a specific query using the techniques described in reference to FIG. 1. For example, the system can calculate a probability that the query "cascal mountain view" is a specific query.

The system determines, based on the first, second, and third probabilities, whether to search the particular collection of resources to identify resources that satisfy the new query (212). In some implementations, the system determines whether to search a particular collection of resources by determining a trigger value based on the first, second, and third probabilities.

One example function for determining a trigger value can be expressed as:

$$t = (1-x)(1-y)(1-z),$$

where t is the trigger value, x is the first probability that the query in the query cache is associated with a particular collection of resources, y is the second probability that the new query names an entity or is a phrase, z is the third probability that the query in the query cache is a specific query.

In some implementations, the system determines that the particular collection of resources should be searched to identify resources that satisfy the new query when the trigger value satisfies a threshold value for the particular collection of resources. For example, assuming the threshold value for the news collection of resources is a probability of 0.05, the system can determine that the news collection of resources should be searched using the new query when the trigger value exceeds a probability of 0.05. In some implementations, the system determines threshold values for a collection of resources by training a statistical data model using a query cache and respective probabilities indicating a likelihood that the collection of resources includes resources that satisfy the respective queries in the query cache.

In some implementations, a threshold value for a particular collection of resources is selected by determining respective trigger values for queries in a query cache and determining whether a search system, e.g., the search system 114, returns useful search results in response to receiving the respective queries. In some implementations, the search system returns useful search results when the search system returns a threshold count of search results that satisfy the query. For example, the search system can determine, for a news collection of resources, that a first query "cascal mountain view" has a trigger value of 0.18 and that it returns useful search results. The search system can also determine, for the news collection of resources, that a second query "videos of birds" has a trigger value of 0.96 and it returns useful search results. Further, the search system can determine, for the news collection of resources, that a third query "sunnyvale day care" has a trigger value of 0.02 and that it does not return useful search results. Based on these determinations, the threshold value for the news collection of resources can be tuned, either manually or through machine learning, to a threshold, e.g., 0.1, so that queries that have useful search results in the news collection of resources, e.g., "cascal mountain view" and "videos of birds," are processed using the news collection of resources, while queries that do not have useful search results, e.g., "sunnyvale day care," are not.

In some implementations, a threshold value for a particular collection of resources is tuned by selecting a threshold value that satisfies an acceptable failure rate, e.g., a failure rate indicating a rate that the search system fails to provide search results in response to queries that should have been provided a response.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   receiving a new query that is not in a query cache, the new query including one or more query terms;
   determining that the new query is a variant of a cached query in the query cache;
   in response to determining that the new query is a variant of the cached query, obtaining a first probability, the first probability indicating a likelihood that a particular collection of resources includes resources that satisfy the cached query;
   calculating a second probability, the second probability being a probability that the one or more query terms in the new query name an entity or are a phrase;
   calculating a third probability, the third probability being a probability that the cached query is a specific query; and determining, based on the first, second, and third probabilities, whether to search the particular collection of resources to identify resources that satisfy the new query.

2. The method of claim 1, wherein the second probability indicates a likelihood that resources in the particular collection of resources include the one or more query terms, the one or more query terms being mutually dependent.

3. The method of claim 1, wherein calculating a third probability, the third probability being a probability that the cached query is a specific query comprises:
   determining a count of resources that include the one or more query terms from the cached query;
   determining a total count of resources in the particular collection of resources; and
   calculating a fraction equal to the count of resources that include the one or more query terms from the cached query divided by the total count of resources in the particular collection of resources.

4. The method of claim 1, wherein calculating a third probability, the third probability being a probability that the cached query is a specific query comprises:
   generating, based on a text clustering, a plurality of clusters, the clusters including resources from the particular collection of resources, wherein the resources have been identified as satisfying the cached query;
   determining a count of resources in a largest cluster in the plurality of clusters, the largest cluster including more resources than other clusters in the plurality of clusters;
   determining a total count of resources in the particular collection of resources; and
   calculating a fraction equal to the count of resources in a largest cluster in the plurality of clusters divided by the total count of resources in the particular collection of resources.

5. The method of claim 1, wherein determining, based on the first, second, and third probabilities, whether to search the particular collection of resources to identify resources that satisfy the new query comprises
   determining a trigger value based on the first, second, and third probabilities;
   determining whether the trigger value satisfies a threshold value for the particular collection of resources; and
   in response to determining that the trigger value satisfies the threshold value for the particular collection of resources, searching the particular collection of resources to identify resources that satisfy the new query.

6. The method of claim 1, wherein the specific query references a specific concept or an entity.

7. A computer storage medium encoded with instructions that when executed by one or more computers cause the one or more computers to perform operations comprising:
   receiving a new query that is not in a query cache, the new query including one or more query terms;
   determining that the new query is a variant of a cached query in the query cache;
   in response to determining that the new query is a variant of the cached query, obtaining a first probability, the first probability indicating a likelihood that a particular collection of resources includes resources that satisfy the cached query;
   calculating a second probability, the second probability being a probability that the one or more query terms in the new query name an entity or are a phrase;
   calculating a third probability, the third probability being a probability that the cached query is a specific query; and
   determining, based on the first, second, and third probabilities, whether to search the particular collection of resources to identify resources that satisfy the new query.

8. The computer storage medium of claim 7, wherein the second probability indicates a likelihood that resources in the particular collection of resources include the one or more query terms, the one or more query terms being mutually dependent.

9. The computer storage medium of claim 7, wherein calculating a third probability, the third probability being a probability that the cached query is a specific query comprises:
   determining a count of resources that include the one or more query terms from the cached query;
   determining a total count of resources in the particular collection of resources; and
   calculating a fraction equal to the count of resources that include the one or more query terms from the cached query divided by the total count of resources in the particular collection of resources.

10. The computer storage medium of claim 7, wherein calculating a third probability, the third probability being a probability that the cached query is a specific query comprises:
    generating, based on a text clustering, a plurality of clusters, the clusters including resources from the particular collection of resources, wherein the resources have been identified as satisfying the cached query;
    determining a count of resources in a largest cluster in the plurality of clusters, the largest cluster including more resources than other clusters in the plurality of clusters;
    determining a total count of resources in the particular collection of resources; and
    calculating a fraction equal to the count of resources in a largest cluster in the plurality of clusters divided by the total count of resources in the particular collection of resources.

11. The computer storage medium of claim 7, wherein determining, based on the first, second, and third probabilities, whether to search the particular collection of resources to identify resources that satisfy the new query comprises
    determining a trigger value based on the first, second, and third probabilities;
    determining whether the trigger value satisfies a threshold value for the particular collection of resources; and
    in response to determining that the trigger value satisfies the threshold value for the particular collection of resources, searching the particular collection of resources to identify resources that satisfy the new query.

12. The computer storage medium of claim 7, wherein the specific query references a specific concept or an entity.

13. A system comprising:
    one or more computers and one or more storage devices storing instructions that are operable, when executed by the one or more computers, to cause the one or more computers to perform operations comprising:
    receiving a new query that is not in a query cache, the new query including one or more query terms;
    determining that the new query is a variant of a cached query in the query cache;
    in response to determining that the new query is a variant of the cached query, obtaining a first probability, the first probability indicating a likelihood that a particular collection of resources includes resources that satisfy the cached query;

calculating a second probability, the second probability being a probability that the one or more query terms in the new query name an entity or are a phrase;

calculating a third probability, the third probability being a probability that the cached query is a specific query; and determining, based on the first, second, and third probabilities, whether to search the particular collection of resources to identify resources that satisfy the new query.

14. The system of claim 13, wherein the second probability indicates a likelihood that resources in the particular collection of resources include the one or more query terms, the one or more query terms being mutually dependent.

15. The system of claim 13, wherein calculating a third probability, the third probability being a probability that the cached query is a specific query comprises:

determining a count of resources that include the one or more query terms from the cached query;

determining a total count of resources in the particular collection of resources; and calculating a fraction equal to the count of resources that include the one or more query terms from the cached query divided by the total count of resources in the particular collection of resources.

16. The system of claim 13, wherein calculating a third probability, the third probability being a probability that the cached query is a specific query comprises:

generating, based on a text clustering, a plurality of clusters, the clusters including resources from the particular collection of resources, wherein the resources have been identified as satisfying the cached query;

determining a count of resources in a largest cluster in the plurality of clusters, the largest cluster including more resources than other clusters in the plurality of clusters;

determining a total count of resources in the particular collection of resources; and calculating a fraction equal to the count of resources in a largest cluster in the plurality of clusters divided by the total count of resources in the particular collection of resources.

17. The system of claim 13, wherein determining, based on the first, second, and third probabilities, whether to search the particular collection of resources to identify resources that satisfy the new query comprises determining a trigger value based on the first, second, and third probabilities;

determining whether the trigger value satisfies a threshold value for the particular collection of resources; and in response to determining that the trigger value satisfies the threshold value for the particular collection of resources, searching the particular collection of resources to identify resources that satisfy the new query.

18. The system of claim 13, wherein the specific query references a specific concept or an entity.

* * * * *